United States Patent [19]

Zerr

[11] Patent Number: 4,612,646
[45] Date of Patent: Sep. 16, 1986

[54] LASER UTILIZING A GASEOUS LASING MEDIUM AND METHOD FOR OPERATING THE SAME

[75] Inventor: Bruce A. Zerr, Harriman, Tenn.

[73] Assignee: The United States of America as represented by the United States Department of Energy, Washington, D.C.

[21] Appl. No.: 542,968

[22] Filed: Oct. 18, 1983

[51] Int. Cl.$^4$ ............................................. H01S 3/22
[52] U.S. Cl. ..................................... 372/58; 372/34; 372/61
[58] Field of Search .................... 372/58, 55, 61, 34

[56] References Cited

U.S. PATENT DOCUMENTS

| | | | |
|---|---|---|---|
| 3,646,475 | 2/1972 | Taylor | 372/58 |
| 3,908,175 | 9/1975 | Damm | 372/58 |
| 4,242,646 | 12/1980 | Macken | 372/58 |
| 4,242,647 | 12/1980 | Macken | 372/58 |
| 4,500,998 | 2/1985 | Kuwabara et al. | 372/55 |

OTHER PUBLICATIONS

Belostotsky et al.; "Vortex-Flow Cooled Laser", *Sov. Jour. Opt. Tech.*, vol. 35, No. 1, Jan.–Feb. 1968.

Nash; "Vortex Heat Exchanger for IR Detectors"; *Appl. Phys.*, vol. 14, No. 12, Dec. 1975.

*Primary Examiner*—Léon Scott, Jr.
*Attorney, Agent, or Firm*—David E. Breeden; Stephen D. Hamel; Judson R. Hightower

[57] ABSTRACT

The invention relates to an improvement in gas lasers and a method of operating the same. In one aspect, the invention is an improved method for operating a high-power gas laser. The improvement comprises introducing the gas lasing medium tangentially to the laser tube at a pressure establishing a forced vortex in the tube. The vortex defines an axially extending core region characterized by a low pressure and temperature relative to the gas inlet and the exterior of the vortex. An electrical discharge is established in the core region to initiate lasing of the gas. The gas discharge from the tube is passed through a diffuser. As in conventional gas lasers, firing results in a very abrupt increase in gas temperature and in severe disruption of the gas. However, the gas vortex almost immediately restores the gas to its pre-firing condition. That is, almost all of the waste heat is transferred radially to the laser wall, and the original gas-flow pattern is restored. As a result, the power output of the laser is increased significantly, and the laser firing repetition rate is markedly increased.

12 Claims, 1 Drawing Figure

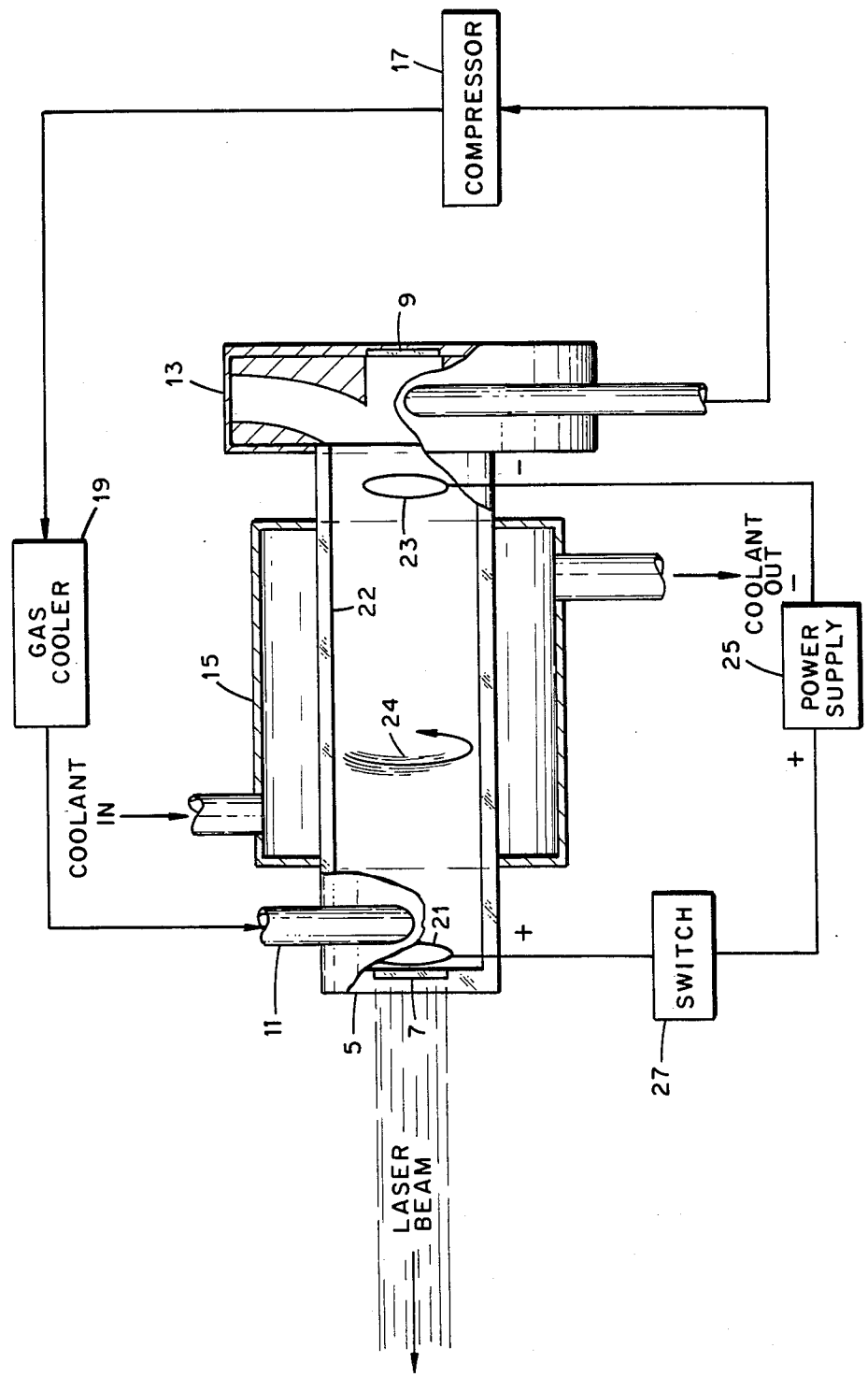

LASER UTILIZING A GASEOUS LASING MEDIUM AND METHOD FOR OPERATING THE SAME

This invention is a result of a contract with the U.S. Department of Energy.

BACKGROUND OF THE INVENTION

This invention relates generally to lasers utilizing a gaseous lasing medium and more particularly to methods and apparatus for improving the operation and cooling thereof. The term "gaseous medium" is used herein to include gases, vapors, and mixture thereof.

In the typical high-power gas laser, an electric discharge or other energy source initiates lasing, which is accompanied by an abrupt increase in the temperature of the gas and by severe gas disturbances, such as shock waves and sound waves. As much as 97% of the power input to the laser may be dissipated as heat. Most of this heat from the high-power laser is removed by a cooling fluid which is circulated about the outside of the laser tube. Before the laser can be re-fired, the gas must be cooled so that the electrons again are at their ground-energy state and the above-mentioned disturbances minimized. Typically, this is accomplished by gas-purging the high-power laser tube several times. The typical purging operation comprises (a) circulating the gas discharge from the laser through an external loop including a blower, a heat exchanger, and flow-straightening means (such as metal guide vanes) and (b) redirecting the conditioned gas through the laser. It would be advantageous if the transfer of heat from the laser gas to the laser-tube coolant could be accomplished more efficiently; this would result in an increase in the laser power output. It would also be advantageous if the transfer of heat could be accomplished by a technique which acts to suppress laser-gas disturbances immediately after firing of the laser occurs.

The following article describes the use of a forced-vortex heat exchanger to cool a gas as it flows through an infrared-detector tube: J. M. Nash, "Vortex Heat Exchanger Cooling for IR Detectors," *Applied Optics*, Vol. 14, No. 12 (December 1975). The described vortex heat exchanger comprises an annular device which is closed at one end and is provided with a diffuser at its other end. Air is introduced tangentially near the closed end and forms a vortex which swirls about the exterior of the detector tube. However, unlike the standard vortex tube, the vortex heat exchanger is connected to a diffuser, allowing the temperature and pressure at the core of the vortex to be much lower than at either the tube inlet or at the periphery (outer circumference) of the vortex. The article states that the provision of a diffuser at the laser-tube outlet markedly increases the efficiency of the vortex tube because it permits the pressure at the center of the vortex to fall below atmospheric without inflow occurring.

The following publication describes a gas laser which is provided with internal spiral heat-exchange fins for directing the laser gas along helical multiple-flow paths while cooling the gas: *Laser & Applications* (September 1982), page 96. The spiral fins periodically direct the gas flow through the electrical discharge, which extends along the laser wall; that is, the discharge path is laterally offset from the central opening defined by the fins. The publication states that the fins provide more efficient heat transfer and a longer gas flow path than are obtained in axial-flow lasers. As a result, a given volume of gas is used more effectively, providing an increase in power output for a given laser length.

The use of forced-vortex flow to air-cool a solid laser is described in the following article: *Soviet Journal of Optical Technology*, Vol. 35, No. 1, January–February 1968. In that arrangement, the air vortex flows about the exterior of an elongated lasing body, or crystal.

As used herein, the terms "forced-vortex" and "forced-vortex flow" refer to a vortex having a longitudinal axis and circular motion, the circular vortex motion about the axis being that of a rotating solid cylinder.

SUMMARY OF THE INVENTION

Accordingly, it is an object of this invention to provide a novel method for operating laser utilizing a gaseous lasing medium.

It is another object to provide a gaseous-discharge laser tube of novel design.

It is another object to provide a laser-cooling method characterized by nearly immediate heat transfer from the central core region of the laser to the inside wall of the laser tube.

It is another object to provide a cooling method for lasers utilizing a gaseous lasing medium, the method effecting rapid suppression of lasing-induced disturbances immediately after firing of the laser.

Other objects and advantages of the invention will be made evident hereinafter.

In one aspect, the invention is an improved method for operating a laser utilizing a gaseous lasing medium. The improvement comprises establishing forced-vortex flow of the medium in the laser tube, and initiating lasing of the medium while in forced-vortex flow. In another aspect, the improved method includes the step of introducing the gaseous lasing medium tangentially to the laser tube at a pressure establishing therein a forced vortex which defines an axially extending core region having a low pressure and temperature relative to the periphery of the vortex. An electrical discharge is established in the core region to initiate lasing of the medium. The gaseous discharge from the tube is passed through a diffuser. In another aspect, the invention is a laser system which includes a laser tube of circular cross section and which is provided with inlet means for tangentially introducing a gaseous lasing medium therein. Diffuser means are connected to the tube for conveying the tangentially introduced medium to the outlet of the diffuser. Compressor means are provided to receive the medium from the diffuser and recycle the same to the inlet means for the tube at a pressure establishing forced-vortex flow of the medium in the tube. Means are provided for initiating lasing of the medium in the region of the tube extending between the tube-inlet means and the diffuser means.

BRIEF DESCRIPTION OF THE DRAWING

The single drawing is a diagram of a laser system designed for operation in accordance with the invention.

DETAILED DESCRIPTION OF THE INVENTION

The invention is generally applicable to lasers utilizing a gaseous lasing medium, but for convenience it will be illustrated in terms of a gas-laser system using helium as the lasing medium.

Referring to the drawing, numeral 5 designates a laser tube which in this embodiment is composed of glass and whose ends are close by conventional laser mirrors 7 and 9. In accordance with the invention, the laser tube is formed with a gas inlet 11 for tangentially introducing helium. The tube is connected to discharge the tangentially introduced helium through an annular diffuser 13. In the illustrated embodiment, the central section of the laser tube is provided with an external jacket 15, through which any suitable cooling fluid is passed. In accordance with the invention, the outlet of the diffuser 13 is connected to the inlet of a compressor 17, whose discharge is fed to the laser gas inlet 11 via a gas cooler 19. The laser tube 5 contains an anode 21 and a cathode 23 both of conventional design, for energizing the laser. Preferably, the spacing between the electrical discharge path and the axis of the laser tube does not exceed about one-half of the radius of the tube. Most preferably, the electrical discharge path is close to or coincident with the axis of the vortex. An electrical circuit including a d.c. power supply 25 and an automatically operated power switch 27 is connected across the laser electrodes. The diffuser and the various supporting components for the laser may be of conventional design.

In a typical operation of the system shown in the drawing, compressed helium is introduced to the nozzle 11 at a pressure which establishes a forced vortex characterized by (1) a relatively low vortex-core pressure which is compatible with optical/gas requirements for the laser and (2) a relatively low vortex-core temperature consistent with effective radial heat transfer from the core to the laser wall. Under these conditions, firing of the laser results in the usual abrupt heating and gas disruptions, but because of the vortex action the helium atoms in the core region are almost immediately restored to their pre-lasing ground state. That is: (1) The initial low gas temperature in the core is re-established almost immediately by radial transfer of almost all of the waste heat through the vortex, to the wall of the laser. Thus, much more heat can be removed by the above-mentioned external cooling fluid than is the case with prior cooling arrangements, and the laser power output (watts per unit length) is increased. (2) After the laser is fired, the disrupted vortex flow pattern of the helium atoms is restored to the pre-firing condition rapidly--probably within the period of a few revolutions of the vortex--permitting the laser to be fired at significantly higher repetition rates.

The following is a more specific illustration of the invention as utilized in the system shown in the drawing. The laser tube 5 and diffuser 13 may, for example, have the following dimensions: (1) laser tube: length, 25"; inside diameter, 5"; (2) diffuser: diameter, 6". In this illustration it is assumed that the forced-vortex cooling system is functioning but that the power supply 25 has not been energized. Gaseous helium is introduced to the laser inlet nozzle 11 at a pressure of 6 atmospheres and a temperature of 40° F. The helium leaves the diffuser outlet 16 at 1.5 atmospheres and 39° F. The pressure drop across the vortex diffuser 13 is 4:1 ($P_2/P_1 = 6.0/1.5$), at which value the performance of the laser tube is at its maximum. (Exceeding this pressure ratio would cause the gas velocity in the axial direction of the tube to exceed the sonic velocity of the gas. At this point the special forced-vortex effect would stop). The forced vortex which forms within the tube cools the helium gas at the central core at constant entropy (s). Assuming 90% efficiency, with the diffuser doubling the resultant change in enthalpy ($\Delta H$), the temperature of the helium gas at the core 24 of the vortex is $-340°$ F. The gas pressure in the core would be 0.1 atmosphere. Calculations based on the conservation of energy and the change in enthalpy ($\Delta H$) of helium would indicate a gas temperature at the wall 22 of $+420°$ F. Thus, the total change in gas temperature within the forced vortex is 760° F.

Under the conditions just cited, the tangential and axial velocity components of the forced vortex are very high. At the tube wall 22, the gas tangential velocity is almost 22,000 feet per second, ($V_t$=Mach 6.2). The calculated axial gas velocity at the wall 22 is 2,800 feet per second, ($V_{AX}$=Mach 0.99). At the vortex core 24, the gas tangential velocity is very small. Theoretically, it is zero, ($V_t=0$). The axial gas velocity in the core does not change, ($V_{AX}$=Mach 0.99).

A possible laser firing repetition rate for the laser just described would be once for each revolution of the forced vortex. At a tangential velocity of 20,000 feet per second, this laser conceivably could fire 15,000 times a second.

The following calculations are based on the above-described laser system operating in the fully functional mode—i.e., with the laser power supply operating and the resulting waste heat being removed by the forced-vortex cooling system. To have a meaningful basis of comparison, it is assumed that the waste heat being generated in the vortex core 24 is sufficient to increase the core gas temperature to 40° F., the same temperature as at the tangential inlet 11. Under these conditions the gas in the whole forced vortex increases in temperature proportionally. The gas at wall 22 now is at 800° F. Waste heat is being removed from the system by two modes, described immediately below.

First, the forced vortex is removing heat from the core 24 radially outwardly, to the wall 22. Because of the extremely high velocity of the gas, the experimentally determined heat-transfer rates were found to be as much as ten times higher than if the laser gas were cooled by conventional gas thermal-conduction means. The heat-transfer rates were found to be so high that it was virtually as if the system were submerged in a liquid. In the foregoing example, about 28,000 joules per second of power (28,000 watts of heat) are being removed from the core via the forced vortex.

Second, waste heat is being removed by gas-purging the system. The laser tube is being sweep-purged axially at a rate of 2,800 feet per second. The helium within the tube is flushed completely 1,300 times a second. This action removes heat at the rate of 144,000 joules per second. By comparison, in a conventionally sweep-purged laser the purging would take place at a rate of about 100 feet per second.

The two heat-removal mechanisms just described are capable collectively of removing over 170,000 joules of waste heat from the laser system. This is a maximum rate. By decreasing the pressure ratio of the inlet gas versus the outlet gas, it is possible to reduce the heat removal by a factor of four.

Still referring to the foregoing example using helium as the lasing medium, essentially any laser tube modified in accordance with the invention will achieve the temperatures, pressures, and velocities cited. Changes in the size of the laser tube have little effect on these parameters. Forced-vortex cooling can be established in tubes at least as small as 5"–6" in length and $\frac{3}{8}$" in inside diameter, and in tubes at least as large as 20' in length and 30"

in inside diameter. However, heat removal is dependent upon the gas throughput and heat-transfer surface area available. The heat-removal rate will range over several orders of magnitude for the range of sizes cited. Given the teachings herein, one skilled in the art will be able to design a suitable forced-vortex cooling system of the kind described, without resorting to more than routine experimentation. The operating temperature at the core of the vortex may be selected from a wide range of values and depends on such factors as the inlet temperature and pressure of the gas and its outlet pressure. The pressure ratio across the vortex tube may, for example, be in the range from about 1.5:1 to 4:1. The length-to-diameter ratio for the tube may be in the range from about 1.5:1 to 5:1.

A laser system designed in accordance with the invention can produce very low core pressures—e.g., 200μ—and may be operated with high inlet pressures—e.g., 5000 psia. The core temperature may approach absolute zero, when helium is the lasing medium. Preferably, the lasing medium is a monatomic gas (Ne, He, Kr) but suitable polyatomic gases may be used—as, for example, $H_2S$, $O_2$, and $N_2$. Metallic vapors (e.g., Cu or Hg) also are suitable. Both single gases and mixtures of gases (such as $He-CO_2-N_2$) or metallic vapors may be utilized in accordance with the invention. Preferably, the laser electrodes are positioned to establish electrical discharge along the axis of the vortex, in order to take full advantage of the refrigeration in the core region.

The diffuser 13 may be of any suitable design which converts the velocity of the gaseous vortex leaving the laser tube into an increase in pressure (potential energy, $\Delta P$). Because the exit pressure from the diffuser is fixed by the suction pressure of the compressor, the pressure ratio translates into a very low pressure in the vortex core. The diffuser significantly decreases the core temperature of the forced vortex, increasing efficiency significantly. Any suitable means may optionally be used to remove heat from the outside wall of the laser tube. For instance, an external vortex heat exchanger of the kind described above (see "Background") may be so used.

Although the invention has been illustrated in terms of lasers of the closed (circulated-gas) type, it is also applicable to the open type. Given the teachings presented herein one versed in the art can determine the most suitable operating conditions for the invention as applied to a particular laser.

The foregoing description of a specific embodiment of the invention has been presented to explain the principles of the invention and to enable others skilled in the art to utilize the invention in various embodiments and various modifications as are suited to a particular contemplated use. It is not intended to be exhaustive; obviously, many modifications and variations are possible in light of the above teaching. It is intended that the scope of the invention be determined from the appended claims.

What is claimed is:

1. In a method for operating a laser wherein a gaseous medium is made to lase while passing through a laser tube, the improvement comprising:

introducing said gaseous medium tangentially into said laser tube to establish a forced vortex therein having a central core region of low pressure and temperature relative to the periphery of said vortex; and initiating lasing of said gaseous medium in said core region.

2. The method of claim 1 wherein said initiating step comprises establishing an electrical discharge in said core region.

3. The method of claim 1 wherein the pressure ratio across said tube is in the range from about 1.5:1 to 4:1.

4. The method of claim 1 wherein the length-to-diameter ratio of said tube is in the range from about 1.5:1 to 5:1.

5. The method of claim 1 wherein said medium is monatomic.

6. The method of claim 1 wherein said medium is polyatomic.

7. In a method for operating a laser wherein a gaseous medium is made to lase while passing through a laser tube, the improvement comprising:

introducing said medium tangentially to said tube at a pressure to establish therein a forced vortex flow of said medium which defines an axially extending core region having a low pressure and temperature relative to the periphery of said vortex, establishing an electrical discharge in said core region to initiate lasing of said medium, and discharging said medium from said tube through a diffuser to further lower the temperature of said medium.

8. The method of claim 7 wherein the pressure ratio across said tube is in the range from about 1.5:1 to 4:1.

9. The method of claim 8 wherein the length-to-diameter ratio of said tube is in the range from about 1.5:1 to 5:1.

10. The method of claim 9 wherein said medium is selected from the group consisting of monatomic and polyatomic gases and vapors and mixtures thereof.

11. In a gas-laser system:

a laser tube of circular cross section, said tube being provided with inlet means for tangentially introducing a gaseous lasing medium therein;

diffuser means connected to said tube for conveying the tangentially introduced gas from said tube to an outlet of said diffuser;

compressor means for receiving said medium from said diffuser outlet and recycling said medium to said inlet means at a pressure sufficient to establish forced-vortex flow of said medium in said tube to produce an axially extending core region of said medium having a low pressure and temperature relative to the periphery of said medium; and means for initiating lasing of said medium in said core region extending between said inlet means and diffuser means.

12. The system of claim 11 wherein a means for cooling said medium is connected in series with said compressor and between said diffuser means and inlet means.

* * * * *